Jan. 17, 1933. C. SCHLUMBERGER 1,894,328
ELECTRICAL DEVICE FOR THE DETERMINATION OF SPECIFIC RESISTIVITY
Filed July 2, 1932
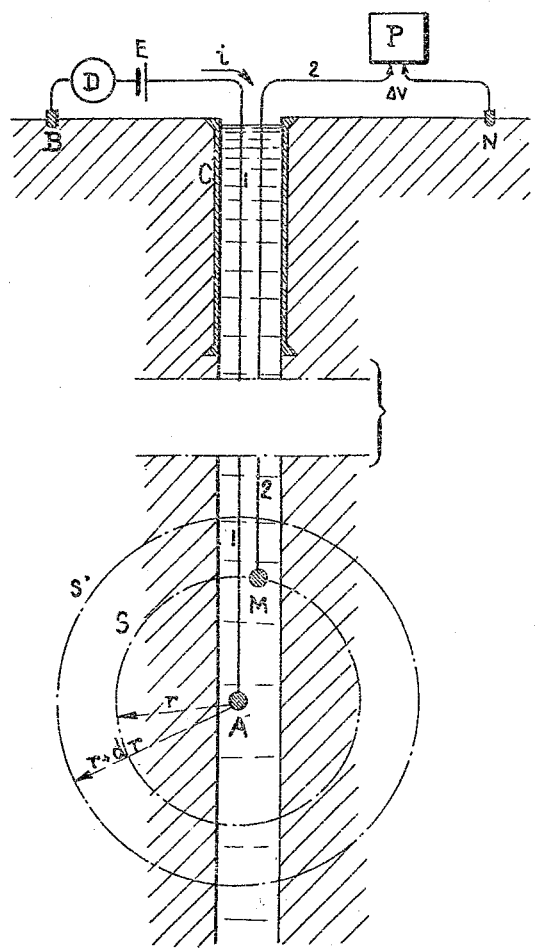
Inventor:-
Conrad Schlumberger
By Mauro & Lewis
Attorneys Patented Jan. 17, 1933

1,894,328

UNITED STATES PATENT OFFICE

CONRAD SCHLUMBERGER, OF PARIS, FRANCE

ELECTRICAL DEVICE FOR THE DETERMINATION OF SPECIFIC RESISTIVITY

Application filed July 2, 1932. Serial No. 620,698.

The measurements of the specific resistivity of rocks, carried out inside the uncased part of a drill hole, have for object the geological reconnaissance of the formations traversed by the drill hole, as has been heretofore explained, in particular in the American Patent No. 1,819,923, of 18th. August 1931. The technique employed up to the present has usually consisted in the use of three movable electrodes, dipping in the water which fills the drill hole. This method necessitates the use of three insulated wires, supporting said electrodes lowered in the drill hole.

It is possible to carry out measurements of the resistivities of rocks by lowering two electrodes only, the third electrode being earthed at a fixed point at the surface. This simplified measuring device gives the resistivities with an approximation which, while less exact than that given by the three electrode device, is nevertheless still sufficient for practical purposes. It renders possible the use of a stranded cable consisting of two insulated wires only, and this may sometimes constitute an important advantage.

The accompanying drawing illustrates the measuring device for carrying out the process in accordance with the present invention. It is interesting to compare this drawing with that of the above mentioned Patent No. 1,819,923, which described the apparatus with three movable electrodes, (see page 1, line 60-100, and page 2, lines 1-35).

The measuring device comprises two insulated wires, 1 and 2, suspended in a drill hole, and terminating in two electrodes A and M. These electrodes dip in the water which fills the uncased part of the drill hole,. and which ensures the electrical connection between the electrodes and the damp conductive rocks forming the wall of the drill hole. The distance $AM=r$, must be known exactly. It is chosen relatively small, for example, about two or three times the diameter of the drill hole. Thus in practice the distance AM is equal to a few feet.

The electrode A is used for sending the electric current into the ground. To this end the insulated wire 1, which supports A, is connected at the surface of the soil, to one of the two poles of a source of electricity E (a dry cell battery, for example), whose other pole is earthed at a given point B at the surface of the soil. For convenience, the metallic casing C, which is always found in the upper part of a drill hole, can be taken for electrode B.

The electrode M is used for measuring the difference of potential created by the passage of the current flowing in the ground between A and B. To this effect, the insulated wire 2, which supports M, is connected to one of the terminals of a potentiometer P, at the surface of the soil, the other terminal being connected to an electrode N, which is earthed. In the following formulæ, the point N is supposed to be placed at an infinite distance from the drill hole, where the potential of the earth is taken as being equal to zero. In practice, this mathematical condition is sufficiently filled when N is not placed in a region where the current flowing from A to B produces a notable drop of potential by ohmic effect, due to the great local density of current. In order to fill this condition, N must be chosen remote from A and B, in other words, the distances NA and NB must be very great in respect to the distance AM, which, as already stated above, measures only a few feet. We may add that if, instead of a small electrode, we chose for B the metallic casing, which has always large dimensions, the density of the current remains very weak in the neighbourhood of B, and therefore only creates insignificant differences of potential. In this case N may be placed near B without causing any inconvenience.

Knowing the distance $AM=r$, the value $i$ of the current flowing in the ground between A and B (which is measured for example, by an ammeter D placed in the circuit), the difference of potential between N and M, which is measured by the potentiometer P, the average resistivity $\rho$ of the rocks in the neighbourhood of the two electrodes A and M, lowered in the drill hole, can be calculated with a sufficient approximation.

When the ground is roughly homogeneous in the neighbourhood of A and M, the calculation is made as follows.

The current $i$ flowing from A into the surrounding ground through the conductive water in the hole creates by ohmic effect an electrical field surrounding A. This field is determined by its equipotential surfaces, which are approximately spheres centered at A, provided that one does not take into consideration:—firstly, the region closely surrounding A, where the presence of the hole filled with water and the dimensions of the electrode A (which is not a geometrical point) cause a certain disturbance; secondly the regions remote from A, where the equipotential surfaces are influenced by the electrode B, the non-homogeneous nature of the ground, or the presence of the metallic casing, etc.

Let us consider the equipotential surface S, passing at the point M. It is approximately spherical, and cuts the drill hole without appreciable deformation. The difference of potential $\Delta V$ between M and N represents approximately the drop of potential between the sphere S and a point situated at an infinite distance from M, according to what has been set forth above for the position of N. To obtain the difference of potential between the sphere S, of radius $r$, and an infinitely close sphere S', of radius $r+dr$, the application of Ohm's law leads to the following expression:—

$$dV = \frac{\rho i}{4\pi r^2} dr$$

The integrant of this expression between the limits $r$ and infinity gives the formula:—

$$(1) \quad \Delta V = \int_r^\infty \frac{\rho i}{4\pi r^2} \cdot dr = \frac{\rho i}{4\pi r}$$

Thus, knowing $\Delta V$, $r$ and $i$, which are measured directly, the value of the resistivity of the rock can be calculated.

Theoretically, the formula (1) is strictly exact only if the ground is everywhere homogeneous, even remote from A. In practice, the drop of potential takes place almost solely in the neighbourhood of the sphere S, where the density of the current is greater. As this density decreases in inverse proportion to the square of the distance to point A, the regions remote from A hardly interfere. It is demonstrated that $\frac{9}{10}$ of the drop in potential occurs between the sphere S and a sphere whose radius is equal to 10 $r$. The calculated resistivity $\rho$ of the rock is thus really that of the rock in the neighbourhood of A.

When the ground cannot be considered as homogeneous in the neighbourhood of the electrode A, calculations more complicated than those set forth above, and which are based on the theory of potentials in heterogeneous media, give the value of the resistivity of the different rocks with an approximation sufficient for practical needs.

What I claim is:

An electrical device for determining the nature of the geological formations traversed by a drill hole, comprising two electrodes placed at a known and small distance from one another in the water filling the uncased part of the said drill hole; means for varying the depth of these two electrodes in the drill hole; means for measuring the current flowing in the circuit constituted when one of these two electrodes is connected by an insulated wire to a source of current whose other pole is earthed; means for measuring the difference of potential thus created between the second electrode in the drill hole and a third electrode in contact with the surface of the soil; said means being connected by insulated wires to said two electrodes, whereby an approximate value for the resistivity of the earth at the depth of the two electrodes inside the drill hole can be deduced.

In testimony whereof I have signed this specification.

CONRAD SCHLUMBERGER.